United States Patent
Majerus et al.

(10) Patent No.: US 11,580,214 B2
(45) Date of Patent: Feb. 14, 2023

(54) AUTHENTICATION LOGGING USING CIRCUITRY DEGRADATION

(71) Applicant: Micron Technology, Inc., Boise, ID (US)

(72) Inventors: Diana C. Majerus, Boise, ID (US); Scott D. Van De Graaff, Boise, ID (US); Todd J. Plum, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 776 days.

(21) Appl. No.: 16/552,302

(22) Filed: Aug. 27, 2019

(65) Prior Publication Data

US 2021/0064732 A1 Mar. 4, 2021

(51) Int. Cl.
*G06F 21/44* (2013.01)
*G11C 8/10* (2006.01)
*G11C 8/20* (2006.01)
*G11C 5/14* (2006.01)

(52) U.S. Cl.
CPC ............. *G06F 21/44* (2013.01); *G11C 5/147* (2013.01); *G11C 8/10* (2013.01); *G11C 8/20* (2013.01); *G06F 2221/2101* (2013.01)

(58) Field of Classification Search
CPC . G06F 21/44; G06F 2221/2101; G11C 5/147; G11C 8/10; G11C 8/20
See application file for complete search history.

(56) References Cited

U.S. PATENT DOCUMENTS

| | | | |
|---|---|---|---|
| 9,977,884 B2 | 5/2018 | Sarkar et al. | |
| 2005/0195975 A1 | 9/2005 | Kawakita | |
| 2009/0164704 A1* | 6/2009 | Kanade | G06F 11/1068 711/E12.001 |
| 2009/0164789 A1* | 6/2009 | Carvounas | G06F 21/445 713/176 |
| 2009/0217058 A1* | 8/2009 | Obereiner | G06F 21/79 713/193 |
| 2013/0191887 A1 | 7/2013 | Davis et al. | |
| 2017/0308432 A1* | 10/2017 | Hsiao | G11C 16/10 |
| 2021/0026786 A1* | 1/2021 | Meier | G11C 11/1695 |

* cited by examiner

*Primary Examiner* — Hee K Song
(74) *Attorney, Agent, or Firm* — Brooks, Cameron & Huebsch, PLLC

(57) ABSTRACT

Apparatuses and methods related to logging failed authentication attempts. Failed authentication attempts can be logged in the circuitry by degrading the circuitry. The degradation can signal a fail authentication attempt while an amount of the degradation can represent a timing of the error.

20 Claims, 7 Drawing Sheets

|  |  | TIMER ELEMENTS | | | | | TEMP SENSOR ELEMENTS | | | | | NEFARIOUS ACTIVITY ELEMENTS | | | | | | |
|---|---|---|---|---|---|---|---|---|---|---|---|---|---|---|---|---|---|
|  |  | 0 | 1 | 2 | 3 | 4 | 5 | 6 | 7 | 8 | 9 | 10 | 11 | 14 | 15 | 16 | 17 |
| 530-1 | 0 FIRST POWER CYCLE | FULL | FULL | 10% | NONE | NONE | NONE | NONE | 58% @ 30C TO 50C | 42% @ 50C TO 70C | NONE | NONE 521-1 | NONE 521-2 | NONE | NONE | NONE | NONE |
| 530-2 | 1 SECOND POWER CYCLE | FULL | 10% | NONE | NONE | NONE | NONE | NONE | 10% @ 30C TO 50C | 42% @ 50C TO 70C | 48% @ 70C TO ??? | NONE 521-3 | NONE 521-4 | NONE | NONE | NONE | NONE |
| 530-3 | 2 THIRD POWER CYCLE | FULL | FULL | FULL | 10% | NONE | NONE | 10% @ 30C TO 50C | 42% @ 50C TO 70C | 48% @ 70C TO ??? | NONE | EVENT 521-5 | NONE 521-6 | NONE | NONE | NONE | NONE |
|  | 3 -- | NONE | NONE | NONE | NONE | NONE | NONE | NONE | NONE | NONE | NONE | NONE | NONE | NONE | NONE | NONE | NONE |
|  | 4 -- | NONE | NONE | NONE | NONE | NONE | NONE | NONE | NONE | NONE | NONE | NONE | NONE | NONE | NONE | NONE | NONE |

*Fig. 5*

AUTHENTICATION LOGGING USING CIRCUITRY DEGRADATION

TECHNICAL FIELD

The present disclosure relates generally to memory, and more particularly to apparatuses and methods associated with logging authentication attempts by circuitry degradation.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. including, but not limited to personal computers, portable memory sticks, digital cameras, cellular telephones, portable music players such as MP3 players, movie players, and other electronic devices. Memory cells can be arranged into arrays, with the arrays being used in memory devices.

Various computing systems include a number of processing resources that are coupled to memory (e.g., a memory system), which is accessed in association with executing a set of instructions (e.g., a program, applications, etc.). For various reasons, a memory system may receive commands from multiple sources. Some commands may be authorized while other commands are unauthorized. Unauthorized commands received at memory may constitute security threats to the memory and/or the data stored in the memory. It may be desirable to limit security threats to memory.

BRIEF DESCRIPTION OF THE DRAWINGS

FIG. 5 illustrates an example of the relationship between power cycles and failed authentication sequence in accordance with a number of embodiments of the present disclosure.

DETAILED DESCRIPTION

Figure 1:
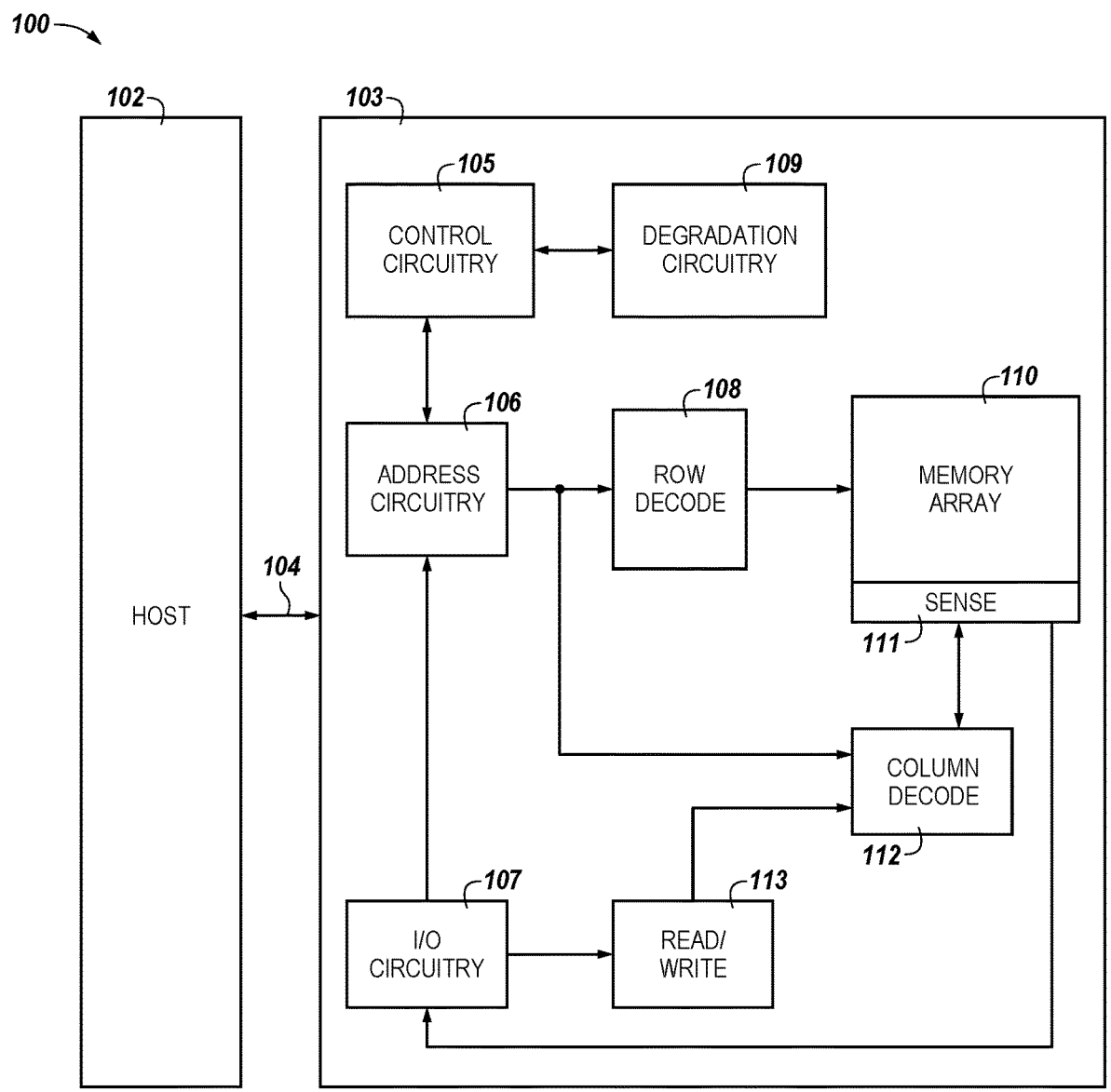
FIG. 1 is a block diagram of an apparatus in the form of a computing system including a memory device in accordance with a number of embodiments of the present disclosure.

The present disclosure includes apparatuses and methods related to logging authentication attempts using degradation circuitry. In a number of examples, devices may experience security threats. It may be desirable to identify which devices may have experienced security threats.

As used herein, a security threat is an unauthorized use of a device. A device may be used by providing commands to the device. For example, if the device is a memory device, then a use of a device may be unauthorized if the device receives and/or processes an unauthorized command. A command may be unauthorized if the command is provided by a source that is not authorized to provide commands to the device.

In some examples, a device can be identified as having experienced a security threat if the device has received and/or processed commands which are unauthorized. The device can perform an authentication procedure to determine whether a process is authorized to provide commands to the device. In various examples, the device can perform an authentication procedure to authenticate itself to the process providing the commands.

The device can log whether the authentication procedure was successful or whether the authentication procedure failed. The authentication procedure may not prevent the device from being compromised such that the device experiences a security threat. However, the device can log an error of the authentication procedure and/or can log time associated with the error of the authentication procedure. As used herein, an error of an authentication process can include a failure of the authentication process and/or an anomaly of the authentication process. The error may result in deviation from a successful authentication and/or a deviation from a successful authentication procedure. Logging an error of the authentication procedure and/or a time of the error provide the ability to evaluate the logs to determine possible security threats and/or a duration of the existence of security threats. For instance, if a device shows signs of a security threat, then the logs can be examined to determine whether authentication procedures failed. A time of the failed authentication procedure can be used to determine a duration of time in which the device has operated with the security threat. Determining a time of the error can be used to further investigate possible corruption of data and/or unauthorized access of the data. As used herein, reference to a time of an error comprise references to a power event associated with an error. For example, if the error occurred during a particular power on event, then the time of the error can describe the power event on which the error occurred. Although the examples described herein are provided in the context of a memory device, the examples described herein can also be applied to other types of devices such as processing devices and/or graphical devices, among other types of devices.

As used herein, "a number of" something can refer to one or more of such things. For example, a number of memory devices can refer to one or more memory devices. A "plurality" of something intends two or more. Additionally, designators such as "N," as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1 is a block diagram of an apparatus in the form of a computing system 100 including a memory device 103 in accordance with a number of embodiments of the present disclosure. As used herein, a memory device 103, a memory array 110, and/or a host 102, for example, might also be separately considered an "apparatus."

In this example, system 100 includes a host 102 coupled to memory device 103 via an interface 104. The computing system 100 can be a personal laptop computer, a desktop computer, a digital camera, a mobile telephone, a memory card reader, or an Internet-of-Things (IoT) enabled device, among various other types of systems. Host 102 can include a number of processing resources (e.g., one or more processors, microprocessors, or some other type of controlling circuitry) capable of accessing memory 103. The system 100 can include separate integrated circuits, or both the host 102 and the memory device 103 can be on the same integrated circuit. For example, the host 102 may be a system controller of a memory system comprising multiple memory devices 103, with the system controller 102 providing access to the respective memory devices 103 by another processing resource such as a central processing unit (CPU).

In the example shown in FIG. 1, the host 102 is responsible for executing an operating system (OS) and/or various applications (e.g., processes) that can be loaded thereto (e.g., from memory device 103 via controller 105). The host 102 may trigger an authentication process to verify that the host 102 is authorized to provide commands to the memory device 103.

The authentication process can be any of a plurality of authentication processes. For example, an authentication process can be comprised of a plurality of authentication sequences. An authentication sequence can be a form of authentication such that the authentication process can perform a plurality of different authentications. Each of the different authentication sequences can be independent from the other different authentication sequences such that the error or passing of a first authentication sequence does not influence the error of passing of a second authentication sequence. Each of the authentication sequences can be of a different type. For example, a first authentication sequence can be an authentication based on a key (e.g., password) while a second authentication sequence can be communication protocol based wherein the authentication is carried out based on whether the communications follow a protocol. The authentication process can be describes as comprising different types of authentications (e.g., authentication sequences). Each of the authentication sequences and/or can comprise multiple steps and/or facets.

For clarity, the system 100 has been simplified to focus on features with particular relevance to the present disclosure. The memory array 110 can be a DRAM array, SRAM array, STT RAM array, PCRAM array, TRAM array, RRAM array, NAND flash array, and/or NOR flash array, for instance. The array 110 can comprise memory cells arranged in rows coupled by access lines (which may be referred to herein as word lines or select lines) and columns coupled by sense lines (which may be referred to herein as digit lines or data lines). Although a single array 110 is shown in FIG. 1, embodiments are not so limited. For instance, memory device 103 may include a number of arrays 110 (e.g., a number of banks of DRAM cells).

The memory device 103 includes address circuitry 106 to latch address signals provided over an interface 104. The interface can include, for example, a physical interface employing a suitable protocol (e.g., a data bus, an address bus, and a command bus, or a combined data/address/command bus). Such protocol may be custom or proprietary, or the interface 104 may employ a standardized protocol, such as Peripheral Component Interconnect Express (PCIe), Gen-Z, CCIX, or the like. Address signals are received and decoded by a row decoder 108 and a column decoder 112 to access the memory array 110. Data can be read from memory array 110 by sensing voltage and/or current changes on the sense lines using sensing circuitry 111. The sensing circuitry 111 can comprise, for example, sense amplifiers that can read and latch a page (e.g., row) of data from the memory array 110. The I/O circuitry 107 can be used for bi-directional data communication with the host 102 over the interface 104. The read/write circuitry 113 is used to write data to the memory array 110 or read data from the memory array 110. As an example, the circuitry 113 can comprise various drivers, latch circuitry, etc.

Control circuitry 105 decodes signals provided by the host 102. The signals can be commands provided by the host 102. These signals can include chip enable signals, write enable signals, and address latch signals that are used to control operations performed on the memory array 110, including data read operations, data write operations, and data erase operations. In various embodiments, the control circuitry 105 is responsible for executing instructions from the host 102. The control circuitry 105 can comprise a state machine, a sequencer, and/or some other type of control circuitry, which may be implemented in the form of hardware, firmware, or software, or any combination of the three. In some examples, the host 102 can be a controller external to the memory device 103. For example, the host 102 can be a memory controller which is coupled to a processing resource of a computing device.

The control circuitry 105 can be coupled to the degradation circuitry 109. The degradation circuitry 109 is further described in FIG. 4. The degradation circuitry 109 can include circuitry which can be degraded to store data. For instance, the circuitry can store binary data by degrading the circuitry such that any degradation can signal a value of a binary bit and no degradation can signal a different value of a binary bit. The amount of the degradation can also be used to store additional data associated with the binary bit. For instance, if the data stored in the degradation circuitry describes the passing or failing of a processing sequence, then the magnitude of the degradation can describe a time associated with the passing or failing of the processing sequence. The greater the degradation of the circuitry the more time that lapsed since the failure or passing of the authentication sequence.

The degradation circuitry 109 can be referred to as a data logger circuit for logging data generated by the control circuitry 105 and/or from other components of the memory device 103. The data logger circuit can include a complementary metal-oxide semiconductor (CMOS) device (e.g., a p-type metal-oxide semiconductor (PMOS) device or an n-type metal-oxide semiconductor (NMOS) device) configured to degrade (e.g., negative-bias temperature instability (NBTI) based degradation or channel hot-carrier (CHC) based degradation) according to the targeted usage information. The memory device 103 can further adjust or vary the amount of degradation for each occurrence to compensate for other factors or conditions (e.g., operating temperature) that influence degradation. In some embodiments, the memory device 103 can adjust the amount of degradation by adjusting a stress voltage used to degrade the CMOS. In some embodiments, the memory device 103 can adjust a duty cycle of a stress input used to degrade the CMOS. Although shown as a separate functional block in FIG. 1, a memory device 103 can include the degradation circuitry 109 within any of the other components described above, such as the control circuitry 105, the input/output circuit 107, etc.

In various examples, the control circuitry 105, the degradation circuitry 109, the address circuitry 106, the row decode 108, the I/O circuitry 107, the read/write circuitry 113, and/or the column docode 112 can be considered periphery circuitry. The periphery circuitry can be coupled to the memory array 110. The periphery circuitry can also comprise a command decoder (not shown). The command decoder can be part of the control circuitry 105 or can be separate from the control circuitry 105. The command decoder can be configured to decode commands received from the host 102. The command decoder can be configured to receive trigger commands. The command decoder can receive a trigger command to perform an authentication sequence.

A first portion of the peripheral circuitry coupled to the memory array can be configured to, responsive to the receipt of the trigger, perform the authentication sequence. The first portion of the peripheral circuitry can be, for example, the control circuitry 105 or a portion of the control circuitry 105. The first portion can be a portion of the control circuitry 105 that is separate from the command decoder which is also included in the control circuitry 105.

A second portion of the peripheral circuitry coupled to the memory array 110 can be configured to, responsive to an error of the authentication sequence, log the error of the authentication sequence in circuitry by degrading one or more components in the second portion of the circuitry. The second portion can be, for instance, the degradation circuitry 109. The second portion of the peripheral circuitry can comprise one or more components configured to degrade, based at least in part on the error of the authentication sequence and a time associated with the error. The second portion of the peripheral circuitry can also comprise a voltage regulator configured to shift a threshold voltage of the circuitry. A shift in the threshold voltage can identify the error. The shift in the threshold voltage can also identify a particular authentication sequence that experienced the error.

The first portion of the peripheral circuitry can comprise logic configured to perform the authentication sequence to authenticate a process executed by a processing resource of the host 102, for example. The first portion of the peripheral circuitry can also comprise logic configured to perform the authentication sequence to unlock the memory device 103.

The memory device 103 can also comprise at least one of a nonvolatile memory, a fuse in the peripheral circuitry (e.g., degradation circuitry 109), or a portion of the memory array 110, or any combination thereof configured to store failed authentication attempts based on the error. The trigger to performing the authentication sequence can be a power event such as the powering on of the memory device 103 or the powering down of the memory device 103. Power events can also include sleep events and/or refresh events, among other events that can be employed by the memory device 103 to preserve energy or carry out the functions of the memory device 103.

In various examples, the peripheral circuitry can comprise complementary metal oxide (CMOS) circuitry located on a same plane as the memory array or under the memory array. For example, the peripheral circuitry can be implemented under the memory array such that the peripheral circuitry resides on a different plane than the memory array.

Figure 2:
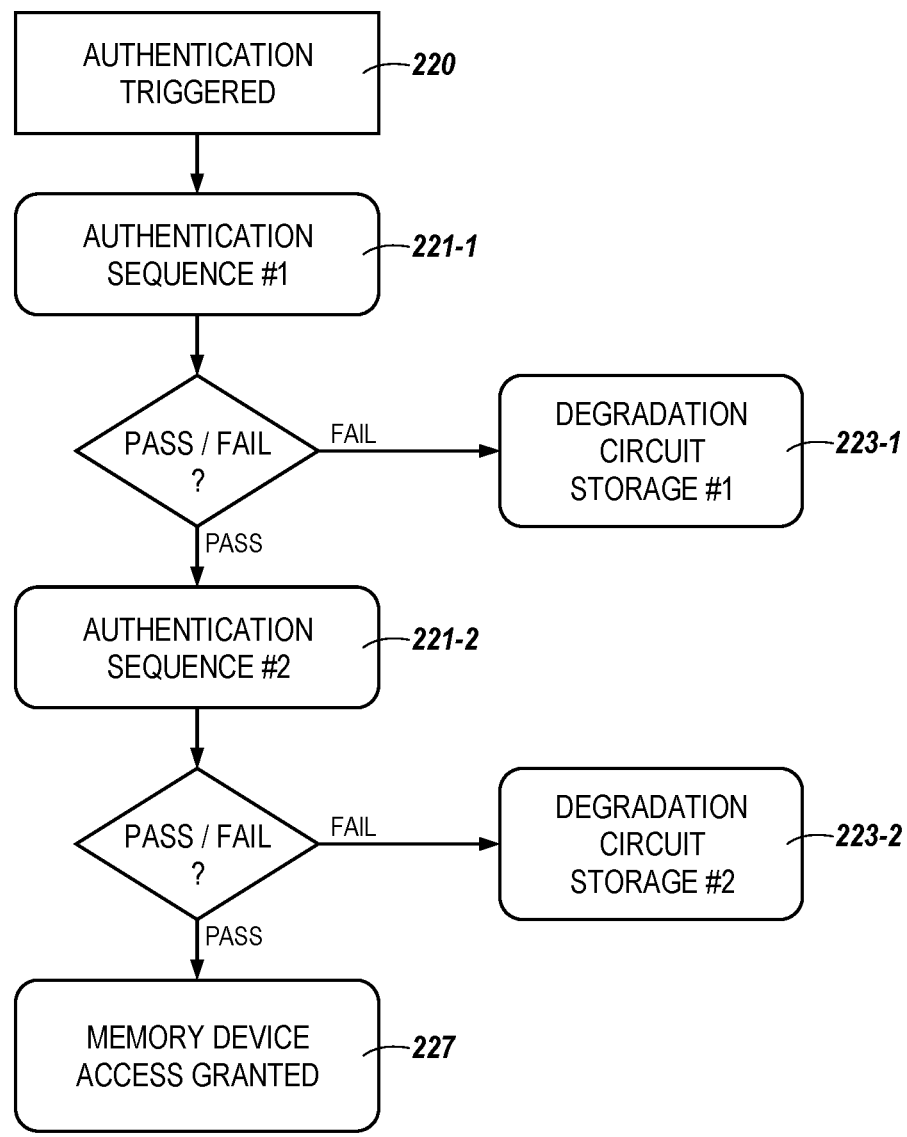
FIG. 2 is a block diagram for logging failed authentication attempts in accordance with a number of embodiments of the present disclosure.

FIG. 2 is a block diagram for logging failed authentication attempts in accordance with a number of embodiments of the present disclosure. An authentication trigger 220 can initiate the authentication sequence 221-1. The authentication trigger 220 can be provided as a power event such as a power up and/or a power down. The authentication trigger 220 can also be provided by a process executed by the host. For instance, a host can provide a command to the memory device. The command can instruct the memory device to perform an authentication process.

The trigger 220 can be associated with data used in the authentication process. For instance, the trigger can be associated with a key, among other types of data that can be used in the authentication process. The trigger can be provided through a command interface (e.g., interface 104 in FIG. 1) while the data associated with the trigger is provided through a data interface.

In some examples, the trigger can be associated with different types of data that can be used in different authentication sequences. For instance, a first set of data can be used in the authentication sequence 221-1 and a second set of data can be used in the authentication sequence 221-2. The first set of data can be of a different type than the second set of data. For instance, the first set of data can be a key while the second set of data includes one or more commands. The data associated with the trigger can be provided at a same time as the trigger and/or can be provided in increments. For instance, the first set of data can be received by the memory device at the time the trigger is received or at the time the authentication sequence 221-1 is performed while the second set of data is received at the time the trigger is received or at the time the authentication sequence 221-2 is performed.

Responsive to receipt of the trigger 220, the control circuitry can perform that authentication sequence 221-1. There may be multiple results to performing the authentication sequence 221-1. For example, the authentication sequence 221-1 can pass or fail. If the authentication sequence 221-1 fails, then the control circuitry can degrade a circuitry 223-1. If the authentication sequence 221-1 passes, the control circuitry can perform authentication sequence 221-2.

Responsive to passing the authentication sequence 221-2, the controller can grant access 227 of the memory device. Although FIG. 2 describes granting access 227 to a memory device responsive to passing the authentication sequence 221-1 and the authentication sequence 221-2, other actions can be performed responsive to passing the authentication sequence 221-1 and/or 221-2.

Responsive to failing the authentication sequence 221-2, the control circuitry can degrade the circuitry 223-2. If a circuitry is used to log the results of a single authentication sequence, then the circuitry can also be used to log a time of the error. The magnitude of the degradation can define a timing element of the error of the authentication sequence.

The circuitry 223-1 and 223-2 can also be used to log the passing of the authentication sequence 221-1 and the authentication sequence 221-2, respectively. For instance, responsive to passing the authentication sequence 221-1 and the authentication sequence 221-2, the circuitry 223-1 and 223-2 are not degraded which can indicate that the authentication sequences 221-1 and 221-2 passed.

In FIG. 2, two different circuitry 223-1 and 223-2 are used to log (e.g., record) the errors of the authentication sequence 221-1 and the authentication sequence 221-2, respectively. However, a single circuitry can be used in different examples to log the errors of the authentication sequence 221-1 and the authentication sequence 221-2.

FIG. 2 shows that the authentication sequence 221-2 can be performed if the authentication sequence 221-1 passes. In other examples, the authentication sequence 221-2 can be performed regardless of whether the authentication sequence 221-2 passes. In various examples, additional actions can be performed responsive to failing the authentication sequence 221-1 and/or the authentication sequence 221-2. For instance, access to the memory device can be rejected responsive to failing the authentication sequences 221-1 and 221-2.

FIG. 2 shows the performance of two authentication sequences, various examples can perform more than or fewer than two authentication sequences. For instance, the authentication process can be composed of a single authentication sequence or three or more authentication sequences. The quantity of authentication sequences can be scaled based on security concerns. For example, the quantity of authentication sequences can be scaled based on security concerns by the memory maker.

Figure 3:
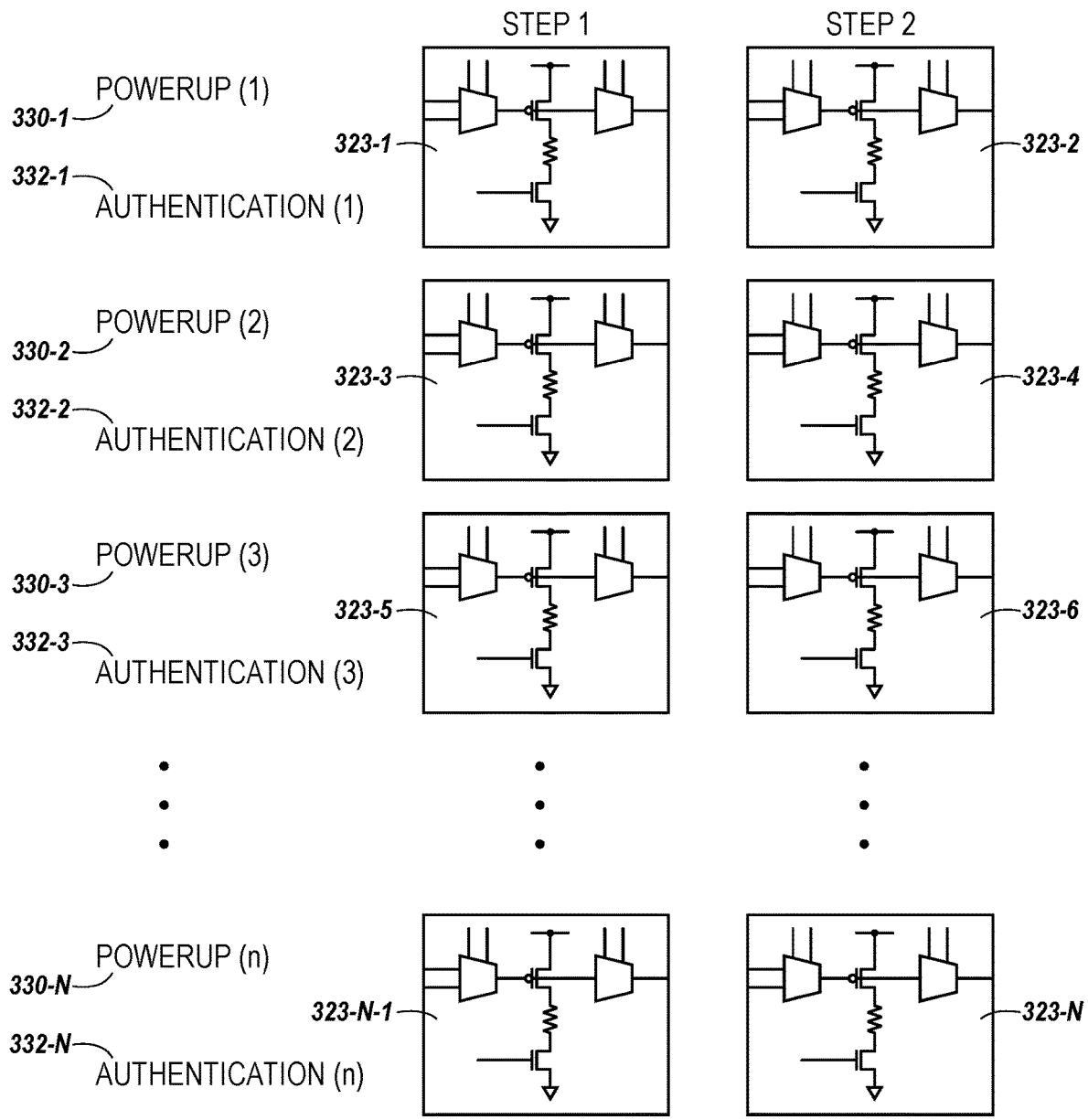
FIG. 3 is a block diagram of a method for logging failed authentication attempts in accordance with a number of embodiments of the present disclosure.

FIG. 3 is a block diagram of a method for logging failed authentication attempts in accordance with a number of embodiments of the present disclosure. FIG. 3 shows a possible relationship between an authentication process and a power event. For instance, FIG. 3 show N power events 330-1, 330-2, 330-3, . . . , and 330-N, referred to as power events 330. A powerup event is used as a power event in FIG. 3, The power events 330 can be used to trigger the authentication processes. For instance, the power event 330-1 can trigger the authentication process 332-1, the power event 330-2 can trigger the authentication process 332-2, the power event 330-2 can trigger the authentication process 332-3, . . . , and the power event 330-N can trigger the authentication process 332-N. Each authentication process can be composed of a first authentication sequence and a second authentication sequence described as step 1 and step 2 in FIG. 3.

The authentication process 332-1 passes given that the corresponding authentication sequences pass. The passing of the authentication sequences corresponding to the authentication process 332-1 can be logged in the circuitry 323-1 and 323-2. The passing of the authentication sequences corresponding to the authentication process 332-2 is logged by not degrading the circuitry 323-1 and 323-2. The passing of the authentication process 332-2 can be logged in the circuitry 323-3 and 323-4 by refraining from degrading the circuitry 323-3 and 323-4. The error of the authentication process 332-3 can be logged in the circuitry 323-5 and 353-6. The passing of the authentication process 332-4 can be logged in the circuitry 323-N-1 and 323-N.

In FIG. 3, the authentication process 332-2 can fail. The authentication process can fail because the first authentication sequence failed. The error of the first authentication sequence can be logged in the circuitry 323-5 by degrading the circuitry 323-5. The authentication process 332-3 can fail even if the second authentication sequence passed because the first authentication sequence failed. FIG. 3 shows that different quantities of circuitry can be used to log the results of the authentication processes spanning multiple power events.

Figure 4:
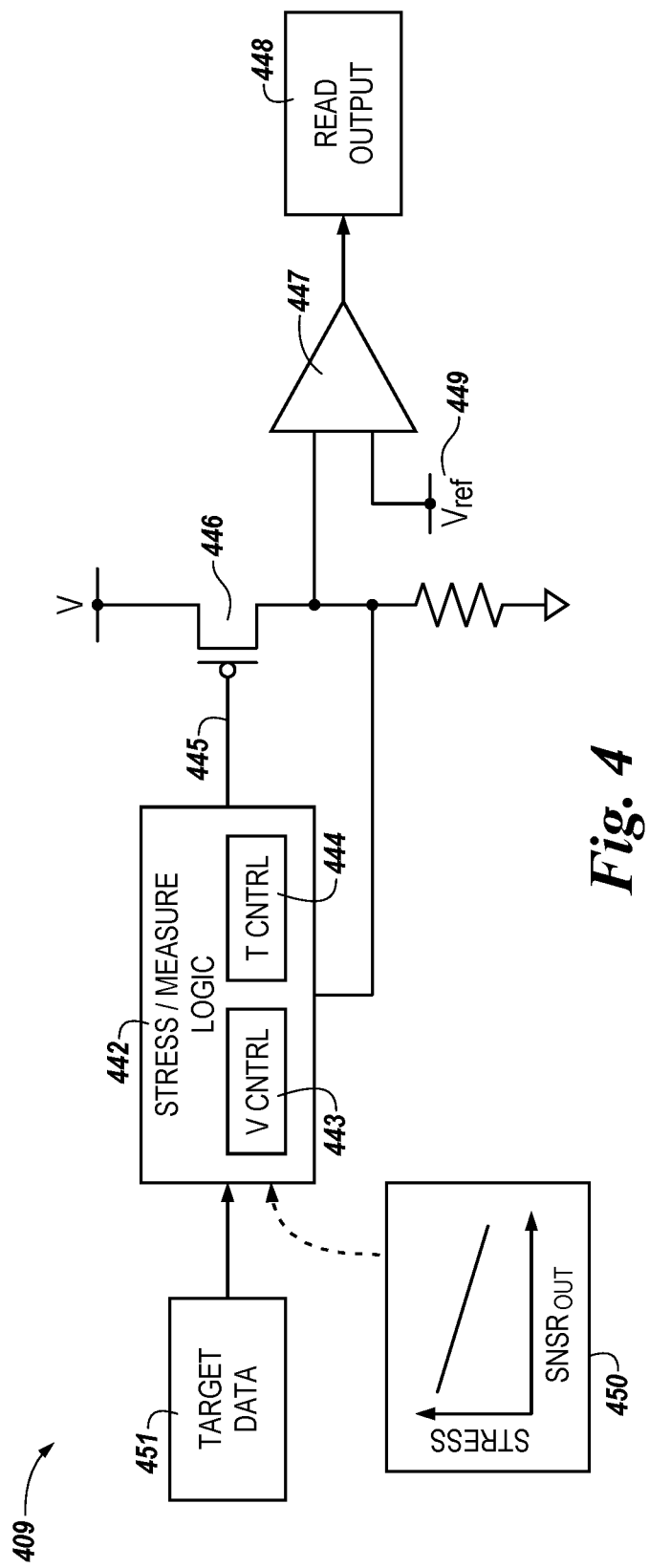
FIG. 4 is a block diagram of degradation circuitry in accordance with a number of embodiments of the present disclosure.

FIG. 4 is a block diagram of the degradation circuitry 409 in accordance with a number of embodiments of the present disclosure. The degradation circuitry 409 can include a stress/measure logic 442, a CMOS degradation-based sensor 446, and an op-amp reader 447.

The stress/measure logic 442 can include a logic circuit configured to determine an occurrence of a specified condition or event in target data 451 and generate a stress input 445 (e.g., a signal or a voltage) that stresses/degrades the CMOS degradation-based sensor 446. For example, the target data 451 can include data representing an error of an authentication process including an error of an authentication sequence comprising the authentication process. The error of the authentication process can be the specific condition or event that stresses/degrades the CMOS degradation-based sensor 446.

The op-amp reader 447 can be configured to use a reference input 449 (Vref) to generate a read output 448 that corresponds to an amount or a degree of degradation in the CMOS degradation-based sensor 446. The op-amp reader 447 provides the ability to read the CMOS degradation-based sensor 446. For example, the read circuit and/or a control circuit can sweep the reference input 449 to generate the read output 448. As the CMOS degradation-based sensor 446 degrades, the required reference voltage to trigger the op-amp will shift in proportion to the threshold voltage (Vt) shift of the sensor core. The amount of degradation can be obtained by comparing the trigger voltage with a reference or unstressed sensor or with a time zero reading taken and/or stored at the factory during manufacture or initial test.

In some embodiments, the CMOS degradation-based sensor 446 can include a PMOS device configured to degrade according to an NBTI. For the PMOS device, the gate can be connected to the stress/measure logic 442, the source can be connected to a voltage source (e.g., a known voltage level, V), and the drain can be connected to the op-amp reader 447, a feedback line to the stress/measure logic 442, a resistor connected to ground, or a combination thereof. In some embodiments, the CMOS degradation-based sensor 446 can include an NMOS device configured to degrade according to CHC. For the NMOS device, the gate can be connected to the stress/measure logic 442, the drain can be connected to the voltage source, and the source can be connected to the op-amp reader 447, the feedback line, the resistor, or a combination thereof.

In some embodiments, degradation of the CMOS degradation-based sensor 446 can be affected by one or more operating conditions. For example, a higher operating temperature of the CMOS degradation-based sensor 446 can increase the amount of degradation. Accordingly, the stress/measure logic 442 can receive one or more relevant condition (e.g., operational temperature) information in addition to the watched condition or event. The stress/measure logic 442 can include a control profile 450 that represents an adjustment to the stress input 445 according to the one or more relevant condition information. In other words, the stress/measure logic 442 can generate the stress input 445 based on the control profile 450 such that the degradation to the CMOS degradation-based sensor 446 is dependent on the watched condition and unaffected by other environmental conditions.

In some embodiments, the stress/measure logic 442 can include a stress voltage control circuit 443 and/or a stress time control circuit 444 configured to control the stress input 445 to achieve an appropriate amount of stress or degradation. For example, the stress voltage control circuit 443 can be configured to control a voltage of the stress input 445 to adjust the stress voltage (e.g., between the voltage source, V, and the stress input 445). For operating temperature, the stress voltage control circuit 445 can decrease the stress voltage as the temperature increases. Also, the stress time control circuit 444 can be configured to control a duty cycle of the stress input 445. For operating temperature, the stress time control circuit 444 can decrease the duty cycle as the temperature increases.

FIG. 5 illustrates an example of the relationship between power 530-1, 530-2, and 530-3 and a failed authentication sequence 521-5 in accordance with a number of embodiments of the present disclosure. FIG. 5 shows power cycles 530-1, 530-2, and 530-3, referred to as power cycles 530. The power cycles 530 can be an example of a power event. FIG. 5 also shows the passing of authentication sequences 521-1, 521-2, 521-3, 521-4, and 521-5 and the errors of authentication sequence 521-5.

The failed authentication sequence 521-5 can be logged in circuitry configured by setting a threshold voltage of the circuitry. The nefarious activity can describe a failed authentication sequence 521-5 given that an error of the authentication sequence 521-5 can indicate possible access to the memory device by a source unauthorized to access the memory device. The failed authentication sequence 521-5 can occur during a power cycle 530-3.

Associating the failed authentication sequence 521-5 with the power cycle 530-3 can indicate that nefarious activities may have occurred after the power cycle 530-3 and may continue occurring after the power cycle 530-3. Associating the failed authentication sequence 521-5 can indicate that a security threat existed in the memory device after the power cycle 530-3.

Figure 6:
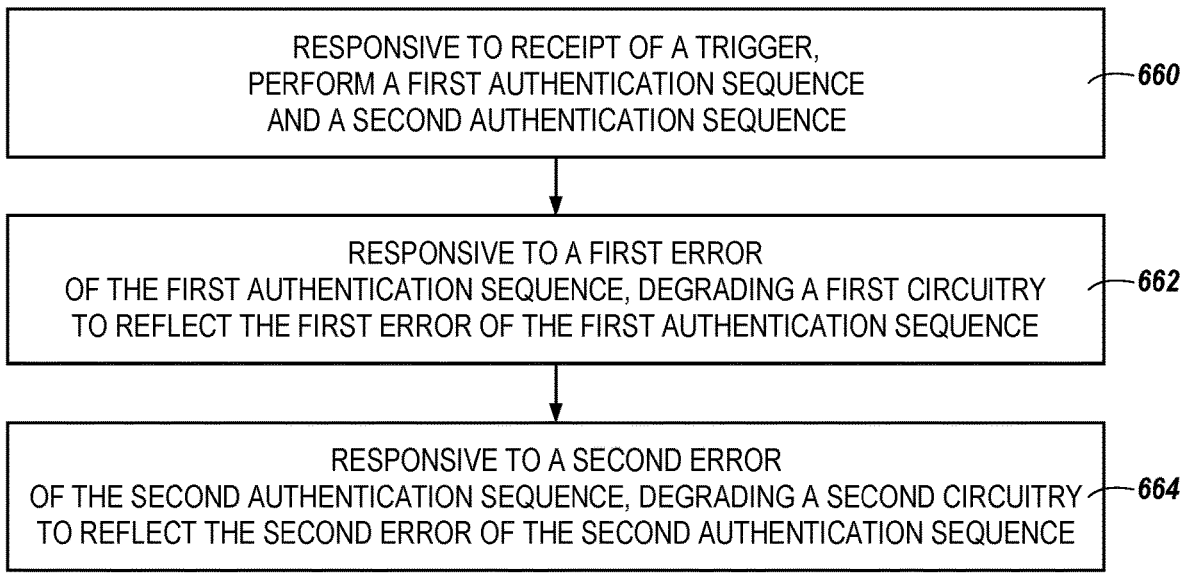
FIG. 6 illustrates an example flow diagram of a method for logging failed authentication attempts in accordance with a number of embodiments of the present disclosure.

FIG. 6 illustrates an example flow diagram of a method for logging failed authentication attempts in accordance with a number of embodiments of the present disclosure. At 660, responsive to receipt of a trigger, a first authentication sequence and a second authentication sequence can be performed. In some examples, the second authentication sequence can be performed if the first authentication sequence is passed.

At 662, responsive to a first error of the first authentications sequence, degrading a first circuitry to reflect a first error of the first authentication sequence. At 664, responsive to a second error of the second authentication sequence, degrading a second circuitry to reflect a second error of the second authentication sequence. Each error of an authentication sequence can be logged in a different circuitry. Logging a result of each of authentication sequences using a circuitry can provide for the concurrent logging of a timing element in the same circuitry. For instance, an error of an authentication sequence and a timing component corresponding to the error can be stored in a circuitry by degrading the circuitry.

The quantity of degradation circuitries can be associated with different authentication sequences. For example, a first degradation circuitry can be associated with a first failed authentication sequence while a second degradation circuitry can also be associated with a second failed authentication sequence. Degrading the first degradation circuitry can indicate that the first authentication attempt was failed. Degrading the second degradation circuitry can indicate that the second authentication attempt was failed. The timing component of the first failed authentication sequence and the second failed authentication sequence can correspond to the failure of the first authentication sequence prior to the failure of the second authentication sequence.

Degrading the first circuitry can include degrading the first circuitry to reflect a time of the first error of the first authentication sequence. Degrading the second circuitry can further include degrading the second circuitry to reflect a time of the second error of the second authentication sequence.

In some embodiments, degrading the first circuitry and the second circuitry can also comprise degrading the first circuitry and the second circuitry to reflect multiple attempts at the first authentication sequence and the second authentications sequence. The first authentication sequence can be performed a plurality of times responsive to the repeated error of the first authentication sequence until a threshold of errors for the first authentication sequence is reached. The second authentication sequence can also be performed a plurality of times responsive to the repeated error of the first authentication sequence. The quantity of performances of the first authentication sequence and the second authentication sequence can differ. The quantity of errors of the first authentication sequence can be logged in a circuitry by degrading the circuitry. The amount of the degradation can signal the quantity of errors of the first authentication sequence while the amount of the degradation can signal the quantity of errors of the second authentication sequence.

Responsive to multiple first errors of the first authentication sequence and the second authentication sequence, the first circuitry can be degraded a first plurality of times and the second circuitry a second plurality of times. Each of the errors can trigger a degrading of a circuitry such that the circuitry can be degraded a quantity of times equal to a quantity of errors of an authentication sequence. Each degradation of the first circuitry and the second circuitry can increase a first threshold voltage of the first circuitry and a second threshold voltage of the second circuitry.

In some embodiments, a trigger to perform an authentication sequence can be received. Responsive to receipt of the trigger, the authentication sequence can be performed. Responsive to an error of the authentication sequence, the error of the authentication sequence can be logged in circuitry by degrading the circuitry.

Degrading the circuitry can reflect the error of the authentication sequence and a time associated with the error. A circuitry can be degraded by shifting a threshold voltage of the circuitry. Shifting a threshold voltage of the circuitry can include shifting a threshold voltage of a transistor of the circuitry.

Any shift in the threshold voltage can identify the error of the authentication sequence and the amount of the shift identifies the time associated with the error of the authentication sequence.

The authentication sequence can authenticate a process requesting access to the memory device or can unlock the memory device among other possible types of authentication. In some examples, the authentication sequence can authenticate the memory device to the process. Based on the authentication sequence, the process can determine whether to store data in the memory device based on whether the memory device has been authenticated.

In various instances, responsive to receipt of a trigger, a first authentication sequence and a second authentication sequence can be performed. Responsive to a first error of the first authentication sequence, the circuitry can be degraded to reflect the first error of the first authentication sequence. Responsive to a second error of the second authentications sequence, the circuitry can be degraded to reflect the second error of the second authentication sequence.

The circuitry can log multiple errors of multiple authentication sequences. The multiple errors can comprise the first and the second error. Capturing multiple errors in a single circuitry can include capturing the multiple errors without identifying whether the multiple errors correspond to the first authentication sequence or the second authentication sequence. The multiple errors can be logged in the circuitry utilizing a plurality of threshold voltages. For instance, a first threshold voltage of a circuitry can represent a first error while a second threshold voltage of the circuitry can represent a second error, and so forth.

A circuitry can act as a counter by determining the amount of the degradation. The multiple errors can be read by determining the degradation of the circuitry.

Figure 7:
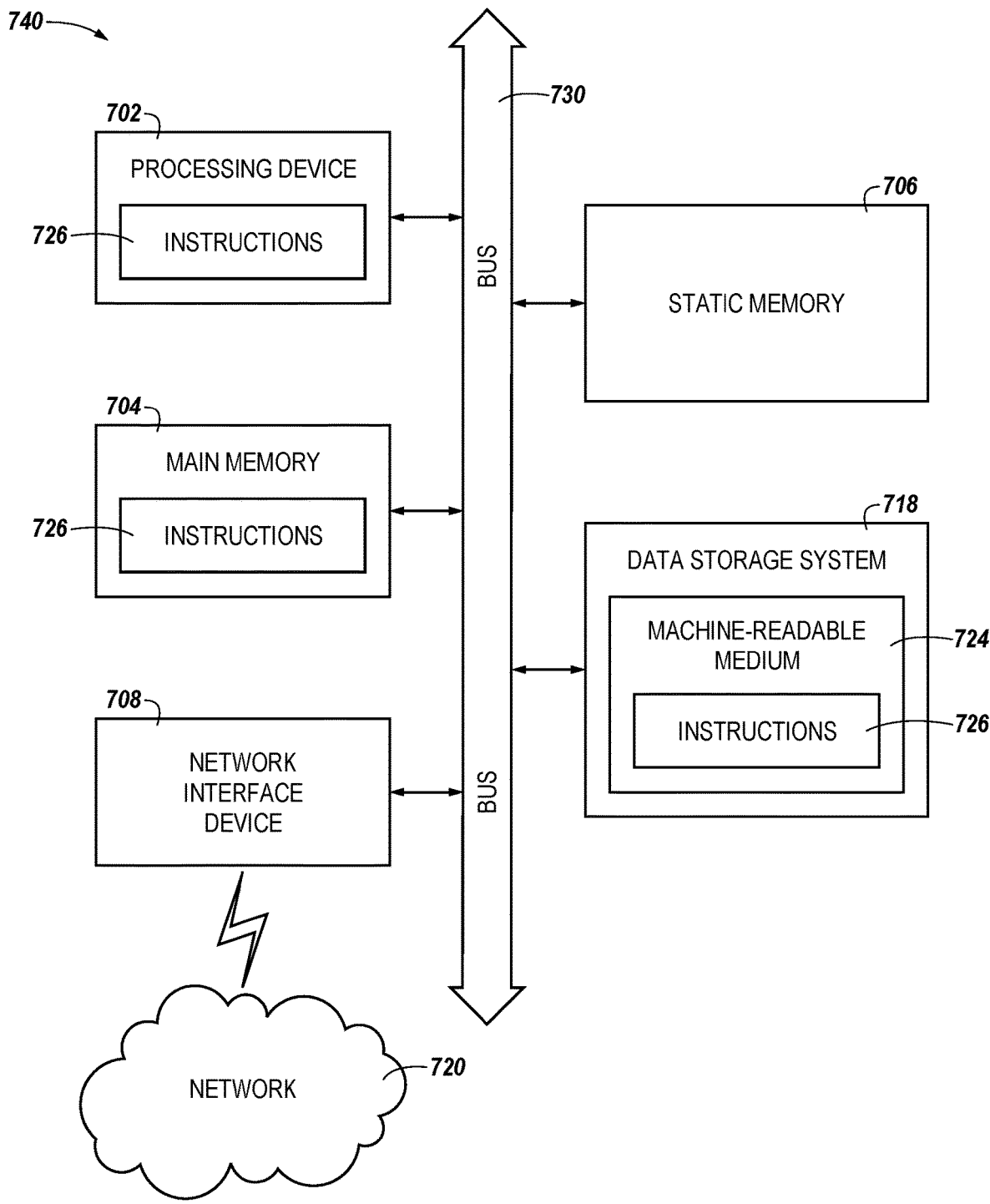
FIG. 7 illustrates an example machine of a computer system within which a set of instructions, for causing the machine to perform various methodologies discussed herein, can be executed.

FIG. 7 illustrates an example machine of a computer system 740 within which a set of instructions, for causing the machine to perform various methodologies discussed herein, can be executed. In various embodiments, the computer system 740 can correspond to a system (e.g., the system 100 of FIG. 1) that includes, is coupled to, or utilizes a memory sub-system (e.g., the memory device 103 of FIG. 1) or can be used to perform the operations of a controller (e.g., the controller 105 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 740 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 740 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 740, the main memory 704 and the processing device 702 also constituting machine-readable storage media.

In one embodiment, the instructions 726 include instructions to implement functionality corresponding to the host 102 and/or the memory device 103 of FIG. 1. While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a memory array;
   peripheral circuitry coupled to the memory array and comprising a command decoder configured to receive a trigger to perform an authentication sequence;
   a first portion of the peripheral circuitry coupled to the memory array and configured to, responsive to receipt of the trigger, perform the authentication sequence; and a second portion of the peripheral circuitry coupled to the memory array and configured to, responsive to an error of the authentication sequence, log the error of the authentication sequence in circuitry by degrading one or more components in the second portion of the peripheral circuitry based at least in part on the error of the authentication sequence and a time associated with the error.

2. The apparatus of claim 1, wherein the second portion of the peripheral circuitry comprises a voltage regulator configured to shift a threshold voltage of the peripheral circuitry.

3. The apparatus of claim 1, wherein a shift in the threshold voltage identifies the error and the shift identifies a particular authentication sequence that experienced the error.

4. The apparatus of claim 1, wherein the first portion of the peripheral circuitry comprises logic configured to perform the authentication sequence to authenticate a process executed by a processing resource.

5. The apparatus of claim 1, wherein the trigger to perform the authentication sequence is powering on the apparatus or powering down the apparatus.

6. The apparatus of claim 1, wherein the first portion of the peripheral circuitry comprises logic is configured to perform the authentication sequence to unlock the apparatus.

7. The apparatus of claim 1, further comprising at least one of a nonvolatile memory, a fuse in the peripheral circuitry, or a portion of the memory array, or any combination thereof, configured to store failed authentication attempts based on the error.

8. The apparatus of claim 1, wherein the peripheral circuitry comprises complementary metal oxide (CMOS) circuitry located on a same plane as the memory array or under the memory array.

9. A method comprising:
responsive to receipt of a trigger, performing a first authentications sequence and a second authentication sequence;
responsive to a first error of the first authentication sequence, degrading a first circuitry to reflect the first error of the first authentication sequence and a time of the first error of the first authentication sequence; and
responsive to a second error of the second authentication sequence, degrading a second circuitry to reflect the second error of the second authentication sequence and a time of the second error of the second authentication sequence.

10. The method of claim 9, wherein degrading the first circuitry and the second circuitry further comprises degrading the first circuitry and the second circuitry to reflect multiple attempts at the first authentication sequence and the second authentications sequence.

11. The method of claim 10, further comprising, responsive to multiple first errors of the first authentication sequence and the second authentication sequence, degrading the first circuitry a first plurality of times and the second circuitry a second plurality of times.

12. The method of claim 11, wherein each degradation of the first circuitry and the second circuitry increases a first threshold voltage of the first circuitry and a second threshold voltage of the second circuitry, respectively.

13. An apparatus, comprising:
circuitry to capture failed authentication attempts;
control circuitry configured to:
responsive to receipt of a trigger, perform a first authentication sequence and a second authentication sequence;
responsive to a first error of the first authentication sequence, degrade the circuitry to reflect the first error of the first authentication sequence;
responsive to a second error of the second authentications sequence, degrade the circuitry to reflect the second error of the second authentication sequence; and
capture multiple errors in the circuitry, wherein the multiple errors comprise the first and the second error, without identifying whether the multiple errors correspond to the first authentication sequence or the second authentication sequence.

14. The apparatus of claim 13, wherein the control circuitry is further configured to degrade the circuitry to capture the multiple errors utilizing a plurality of threshold voltages.

15. The apparatus of claim 13, wherein the control circuitry is further configured to increase a threshold voltage of the circuitry a quantity of times equal to a quantity of the multiple errors.

16. The apparatus of claim 13, wherein the control circuitry is further configured to read multiple errors by determining the degradation of the circuitry.

17. The apparatus of claim 13, wherein the control circuitry is further configured to perform a plurality of actions corresponding to a failed authentication responsive to the circuitry having a particular threshold voltage.

18. An apparatus, comprising:
a memory array;
peripheral circuitry coupled to the memory array and comprising a command decoder configured to receive a trigger to perform an authentication sequence, wherein the peripheral circuitry comprises complementary metal oxide (CMOS) circuitry located on a same plane as the memory array or under the memory array;
a first portion of the peripheral circuitry coupled to the memory array and configured to, responsive to receipt of the trigger, perform the authentication sequence; and
a second portion of the peripheral circuitry coupled to the memory array and configured to, responsive to an error of the authentication sequence, log the error of the authentication sequence in circuitry by degrading one or more components in the second portion of the periphery circuitry.

19. A method comprising:
responsive to receipt of a trigger, performing a first authentications sequence and a second authentication sequence;
responsive to a first error of the first authentication sequence, degrading a first circuitry to reflect the first error of the first authentication sequence; and
responsive to a second error of the second authentication sequence, degrading a second circuitry to reflect the second error of the second authentication sequence;
responsive to multiple first errors of the first authentication sequence and the second authentication sequence, degrading the first circuitry a first plurality of times and the second circuitry a second plurality of times,
wherein the first circuitry and the second circuitry are degraded to reflect multiple attempts at the first authentication sequence and the second authentications sequence, and
wherein each degradation of the first circuitry and the second circuitry increases a first threshold voltage of the first circuitry and a second threshold voltage of the second circuitry, respectively.

20. An apparatus, comprising:

circuitry to capture failed authentication attempts;

control circuitry configured to:
- responsive to receipt of a trigger, perform a first authentication sequence and a second authentication sequence;
- responsive to a first error of the first authentication sequence, degrade the circuitry to reflect the first error of the first authentication sequence;
- responsive to a second error of the second authentications sequence, degrade the circuitry to reflect the second error of the second authentication sequence; and
- perform a plurality of actions corresponding to a failed authentication responsive to the circuitry having a particular threshold voltage.

* * * * *